United States Patent [19]

Schnall et al.

[11] 4,154,527
[45] May 15, 1979

[54] ARRANGEMENT FOR SUPPORTING ORIGINAL DOCUMENTS ON AN OPTICAL COPYING MACHINE

[75] Inventors: Günther Schnall, Eching; Wolfgang Ebner, Munich; Hanns Blöchl, Unterhaching; Erich Schlick, Riedmoos; Georg Fryda, Munich, all of Fed. Rep. of Germany

[73] Assignee: AGFA-Gevaert, A.G., Leverkusen, Fed. Rep. of Germany

[21] Appl. No.: 858,164

[22] Filed: Dec. 7, 1977

[30] Foreign Application Priority Data

Dec. 10, 1976 [DE] Fed. Rep. of Germany ....... 2655963

[51] Int. Cl.² ............................................. G03B 27/62
[52] U.S. Cl. ......................................... 355/75; 355/93
[58] Field of Search ......................... 355/8, 75, 76, 93

[56] References Cited
U.S. PATENT DOCUMENTS 3,630,620 12/1971 Fackler .................................. 355/76

Primary Examiner—Richard A. Wintercorn
Attorney, Agent, or Firm—Michael J. Striker

[57] ABSTRACT

An optical copier has a transparent exposure plate which supports a portion of an original document to be copied and exposes the latter to light rays during the copying operation. The transparent plate extends across an opening of a frame, being inwardly offset with respect to a support surface of the frame. A lid is mounted on the frame for pivoting between a closed position in which the lid covers the transparent plate, and fully open position. A marginal portion of the frame holds the lid in its fully open position so that the lid serves to support another portion of the original document. A hinge which mounts the lid on the frame may include a connecting link and two pivots which respectively connect the link to the lid and to the frame. The hinge may be mounted either on the lid or on the frame for an easy detachment therefrom, for instance, by resiliently yieldable bearing blocks which engage with snap action behind an edge portion which surrounds an orifice. The easy detachment may also be achieved by providing bifurcated connecting members whose prongs yieldably embrace and engage an axle.

14 Claims, 5 Drawing Figures

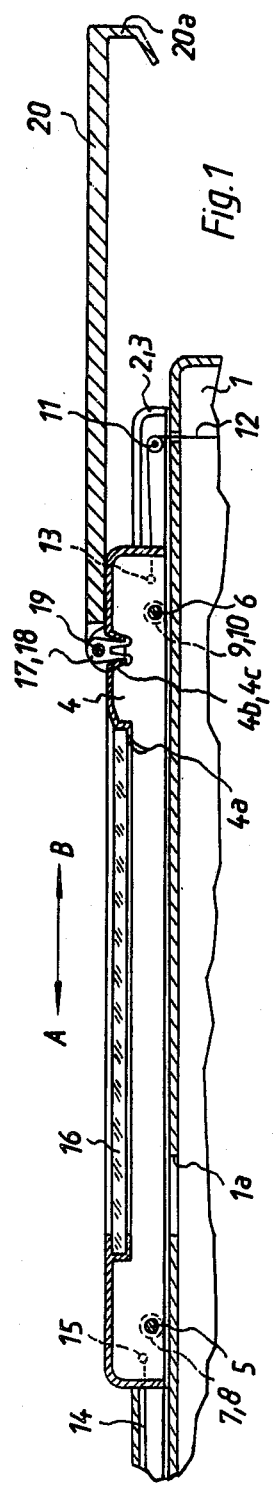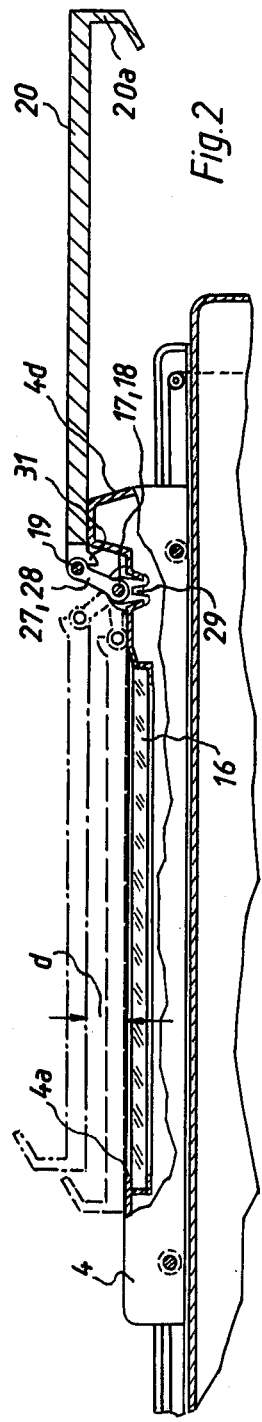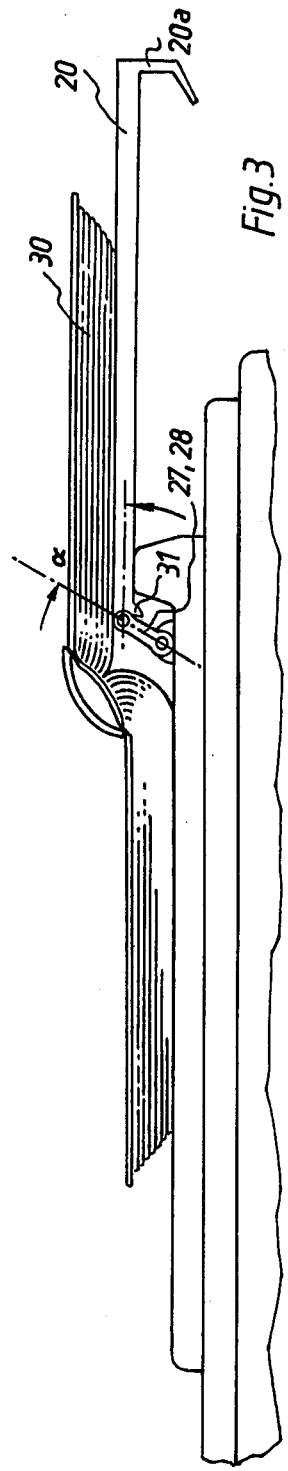

ARRANGEMENT FOR SUPPORTING ORIGINAL DOCUMENTS ON AN OPTICAL COPYING MACHINE

BACKGROUND OF THE INVENTION

The present invention relates to an optical copying apparatus in general, and more particularly to an arrangement for supporting original documents to be copied on such apparatus.

Various constructions of copying apparatus, for instance, of the photostatic type, are already known and in widespread use. Basically, such optical copying apparatus exposes portions of the original documents to be copied to light rays, usually through a transparent plate or the like, and transfers images from the original document to copy sheets. The operation of the copying apparatus proper, regardless of its particular construction and mode of operation, is so well known as not to need any detailed discussion herein. In order to understand the present invention, all that is required is to realize that the optical copying apparatus has a support surface, provided on one or more of the components of the apparatus, and that the original documents to be copied are supported on such support surface, whether they be loose sheets, elongated strips or even three-dimensional objects such as books. All other details of the optical copying apparatus, particularly the way in which the copying apparatus operates, are quite unimportant for understanding the present invention.

There is already known, for instance, from the U.S. Pat. No. 3,597,074 an optical copying apparatus of the above-discussed type in which a transparent exposure plate is mounted in a frame, being inwardly offset from the exposed support surface of the frame. A hinge pivotally mounts a lid on the frame for displacement into and out of a closed position in which the lid covers at least the transparent plate. This copying apparatus further includes an arrangement which holds the lid, which is rigid, in such a position that a different portion of the original document than that which is then to be copied can be supported on the rigid lid. The holding arrangement for the lid of this copying apparatus includes support rods which can be arrested in the proper positions thereof by means of setting screws. It will be appreciated that the setting procedure is very laborious, which is especially disadvantageous in the context of present high-speed copiers. In addition thereto, the holding rods of this reference are only in line contact, rather than in surface contact, with the original document, which may be disadvantageous under some circumstances. Furthermore, a substantial amount of skill is required on the part of the operator of the copying apparatus for the operator to be able to adjust the positions of the rods in accordance with the type of the original document which is being copied by the optical copying apparatus.

SUMMARY OF THE INVENTION

Accordingly, it is a general object of the present invention to avoid the disadvantages of the prior art.

More particularly, it is an object of the present invention to develop a support arrangement for original documents to be used in an optical copying apparatus, which is not possessed of the disadvantages of the conventional support arrangements of this type.

A concomitant object of the present invention is to so design the support arrangement as to be simple in construction, inexpensive, easy to operate and reliable nevertheless.

A still another object of the present invention is to so construct the support arrangement as to provide a reliable support for the original document, regardless of its particular type.

In pursuance of these objects and others which will become apparent hereafter, one feature of the present invention resides, in an optical copying apparatus, in a combination which comprises means for supporting a respective original document to be copied on the apparatus in a copying position, including a frame having a support surface and a marginal portion and bounding an opening which opens onto the support surface, and a transparent plate extending across the opening inwardly offset from the support surface and serving to expose at least a portion of the original document to light rays during the copying operation of the apparatus; a rigid lid; and means for mounting said lid on said frame for displacement between a closed position in which the lid covers at least the transparent plate and a fully open position, including at least one hinge which is so situated with respect to the marginal portion of the frame that the lid abuts against the marginal portion to be held thereby in the fully open position for the lid to be able to support another portion of the original document thereon.

When the above-mentioned construction is resorted to, it is achieved, in a very simple manner, that the rigid lid can be moved, in a single operation, and without a special adjusting operation, into a position in which the lid is capable of supporting portions of the original document or even the entire original document during its passage by the exposure opening of the optical copying apparatus. In addition to its operational simplicity and other advantages, the mounting of the lid in the manner proposed by the present invention facilitates the designing of the entire apparatus because of the simple construction and operation of the lid.

The arrangement of the present invention is not only suited for use as an additional guiding surface, possibly constituted by rotating rollers or the like, for sheet-shaped original documents passing through the copying apparatus in a continuous fashion, but also as an additional rest or support for three-dimensional original documents, such as books, brochures or the like, in copying apparatus capable of handling such three-dimensional original documents. Also, because of the pronounced simplicity thereof, this arrangement can be used, to advantage, even in copying apparatus which is equipped with a movable copying carriage.

Thus, it is proposed, according to an advantageous aspect of the present invention, to mount the rigid lid, in the above-mentioned manner, on a movable copying carriage. According to a further advantageous concept of the present invention, the hinge includes a link having a length substantially corresponding to a maximum thickness of a respective three-dimensional original document, the two pivots which respectively articulate the link to the lid and to the frame. It is very advantageous for achieving an optimum displacement behaviour during the opening of the lid to provide an abutment which is so located at the link as to entrain the same for displacement with the lid after the latter has been displaced from the closed position toward the fully open position through an angle of approximately 90°.

According to a further currently preferred facet of the present invention which is used in conjunction with the hinge including the above-mentioned link, the marginal portion of the frame is raised relative to the remainder of the support surface by a distance substantially corresponding to the length of the link. In this manner, it is achieved that a substantially horizontal support surface is obtained on the lid even when the hinge includes the above-mentioned link.

In view of the fact that it may be necessary or desirable to be able to remove the lid prior to the performance of certain copying procedures, it is another feature of the present invention that the mounting means is further advantageously equipped with means for detachably connecting the hinge to one of the lid and frame. To achieve the detachable mounting, the hinge may include at least one bearing block and an axle mounted on and interconnecting the lid and the bearing block for relative pivoting. Then, the detachably connecting means may include at least one edge portion which bounds an orifice in the frame, and at least one elastically yieldable portion of the bearing block which engages the edge portion to connect the bearing block to the frame. Advantageously, the elastically yieldable portion has a projecting hook portion which engages behind the edge portion. The bearing block may be further equipped with another elastically yieldable portion which is similar to and coextensively spaced from the one elastically yieldable projection, the projecting hook portions of the elastically yieldable portions extending in opposite directions from the respective elastically yieldable projections, particularly outwardly of the bearing block. It is further advantageous when the bearing block is in its entirety of a resiliently yieldable synthetic plastic material. In this manner, there is obtained a flat surface without projecting portions after the detachment of the lid from the frame.

Alternatively, the hinge may include an axle mounted on one of the frame and lid, and detachably connecting means may include at least one bifurcated connecting member rigid with the other of the lid and frame and having two elastically yieldable prongs which embrace the axle to connect the lid to the frame. Advantageously, the prongs have respective chamfered surfaces which contact the axle during the introduction of the axle between the prongs to elastically deflect the latter.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a sectional view of the arrangement of the present invention which is mounted on a movable copying carriage;

FIG. 2 is a view similar to FIG. 1 but illustrating a multipartite hinge for the lid;

FIG. 3 is a side elevational view corresponding to FIG. 2 and illustrating how a book can be supported on the arrangement of the present invention;

DETAILED DISCUSSION OF THE PREFERRED EMBODIMENTS

Figure 5:
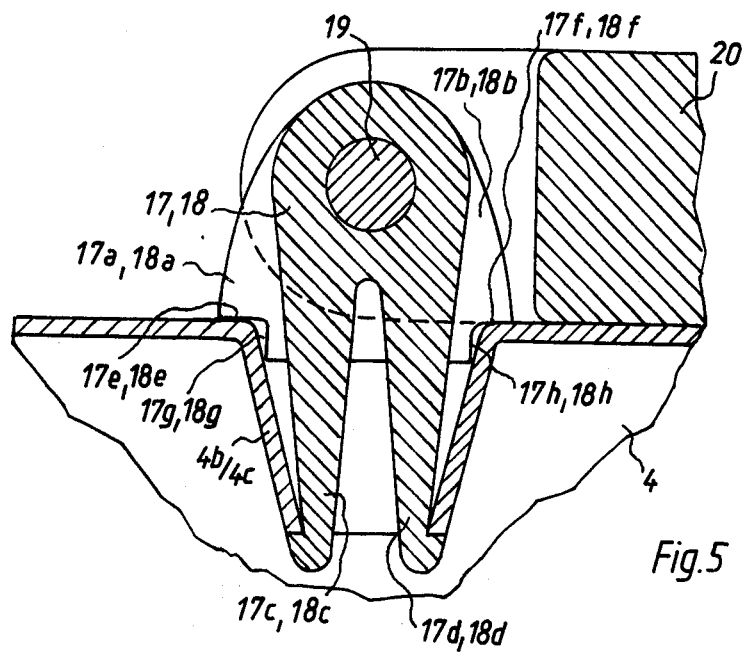
FIG. 5 is a sectional view of a detail of the mounting of the lid on the frame, illustrating a detachable bearing block.

Referring now to the drawing in detail, and first to FIG. 1 thereof, it may be seen that a housing of an optical copying apparatus has been indicated by the reference numeral 1. Guiding rails 2, 3 are mounted on the housing 1, and a copying carriage 4 is mounted on the guiding rails 2, 3 for movement along the same in the directions of the arrows A-B. The copying carriage 4 is guided on the guiding rails 2, 3 by means of support rollers 7 to 10 which are mounted on axles 5 and 6. The housing 1 has an exposure opening 1a and the copying carriage is being moved to-and-fro past the exposure opening 1a so as to displace a sheet-shaped or a three-dimensional original document past the exposure opening 1a of the housing 1. The movement of the copying carriage 4 in the direction B results from the action of a cable 12 or the like which is trained about a roller 11 and connected to a pin 13, and in the direction A by means of a cable 14 or the like which is connected to a pin 15. The cables 12 and 14 are moved in a conventional, non-illustrated manner, synchronously with the image-transferring drum or the like of the copying apparatus.

An opening 4a is provided at the upper side of the copying carriage 4, and a transparent plate 16 extends across the opening 4a and is inwardly offset from the exposed surface face of the carriage 4. Two funnel-shaped, inwardly converging openings 4b, 4c are provided in the vicinity of the marginal portion bounding the opening 4a, and two bearing blocks 17 and 18 are inserted into the orifices 4b and 4c. The two bearing blocks 17 and 18 embrace an axle 19, and a rigid lid 20, for instance, injection-molded synthetic plastic material lid, is mounted on the axle 19. An elongated gripping portion 20a is formed on the lid 20.

As especially apparent from FIG. 5, the bearing blocks 17 and 18 have respective resiliently yieldable hook-shaped sections 17c, 18c and 17d, 18d, the latter engaging behind the edge portion of the converging orifice 4b or 4c of the copying carriage 4. In order to render the dismounting of the lid 20 possible, apertures 17a, 18a, 17b, 18b are formed in the bearing blocks 17, 18, and a screwdriver or a similar tool can be introduced thereinto in order to release the hook-shaped sections 17c, 17d, 18c, 18d. During the original or renewed mounting of the bearing blocks 17, 18, the hook-shaped sections 17c, 17d, 18c, 18d are automatically pressed toward one another during their passage through the funnel-shaped orifice 4b or 4c, and they engage behind the inner edge portion of the orifice 4b or 4c while abutment surfaces 17e, 18e and 17f, 18f of the bearing blocks 17, 18 abut the upper surface of the copying carriage 4. However, it is to be understood that the bearing blocks 17 and 18 could also be inserted directly into the upper wall of the copying apparatus. The bearing blocks 17 and 18 further have projections 17g, 17h, 18g, 18h which serve to center the respective bearing blocks 17, 18 in the orifices 4b, 4c when the bearing blocks 17, 18 are introduced into the latter to the greatest possible extent.

Figure 4:
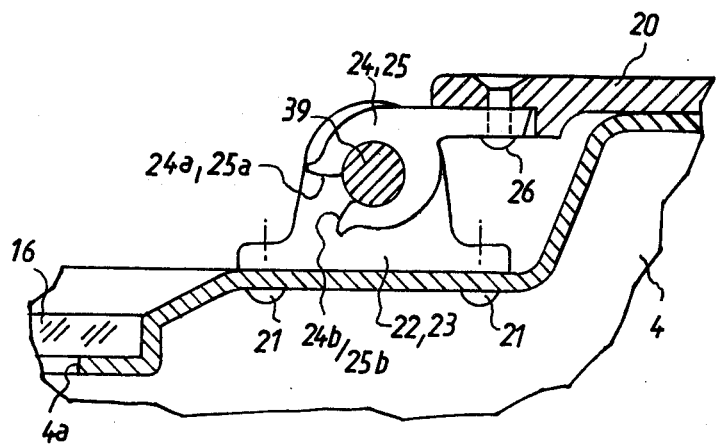
FIG. 4 is a detail similar to FIG. 5 but illustrating a bifurcated connecting member.

FIG. 4 illustrates another possibility og the detachable connection for the lid 20. Herein, an axle 39 for the lid 20 is held on the copying carriage 4 by means of stationary bearing blocks 22, 23 which are attached to the copying carriage 4 by means of screws 21. Bifurcated connecting members 24, 25, which are connected to the lid 20 by rivets 26, and which are preferably made of elastic synthetic plastic material, embrace the axle 39. Each of the connecting members 24, 25 has two elastically yieldable prongs, each of which is formed with a chamfered surface 24a, 24b, 25a, 25b which render it possible to simply push the bifurcated connecting members 24, 25 onto the axle 39, by causing the prongs of the connecting members 24, 25 to deflect apart during the introduction of the connecting members 24, 25 onto the axle 39.

As illustrated in FIGS. 2 and 3, which are in many respects similar to FIG. 1 so that the same reference numerals have been used to designate like parts, links 27, 28 are incorporated in the hinges which connect the lid 20 with the bearing blocks 17, 18. The links 27, 28, which connect the axle 19 are mounted on the lid 20 with a further axle 29 supported on the bearing blocks 17, 18, have a length which substantially corresponds to a thickness d of the thickest three-dimensional original document which is to be supported on the copying carriage 4. Then, as illustrated in FIG. 2 in dash-dotted lines, the lid 20 can rest on such three-dimensional original document still in substantial parallelism with the exposure plate 16, that is, substantially horizontally as illustrated. On the other hand, as illustrated in dashed lines in FIG. 2, the lid 20 can still sandwich a single sheet between itself and the exposure plate 16.

In order for the lid 20 to be able to constitute a horizontal support for an open book 30 in the fully open position thereof shown in FIG. 3, despite the presence of the additional link 27, 28, a raised marginal portion 4d is formed next to the exposure opening 4a of the copying carriage 4, and the lid 20 rests on such raised marginal portional 4d in the fully open position thereof.

In order to facilitate the transfer of the lid 20 from its closed position illustrated in dashed lines in FIG. 2, into the fully open position thereof illustrated in full lines in FIG. 2, abutments 31 are provided on the lid 20 which commence to entrain the links 27 and 28 for displacement with the lid 20 as soon as the angle $a$ between the lid 20 and the links 27, 28 reaches the magnitude of about 90°.

It will be understood that each of the elements described above, or two or more together, may also find a useful application in other types of constructions differing from the types described above.

While the invention has been illustrated and described as embodied in a mounting arrangement for mounting a lid on a copying carriage of an optical copying apparatus, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential chracteristics of the generic or specific aspects of this invention.

What is claimed as new and desired to be protected by Letters Patent is set forth in the appended claims:

1. In an optical copying apparatus, a combination comprising means for supporting a respective original document to be copied on the apparatus in a copying position, including a frame having a support surface and a marginal portion and having one side facingjtowards and bounding an opening which opens onto the support surface and another side facing outwardly away from said opening, and a transparent plate extending across said opening inwardly offset from said support surface and serving to expose at least a portion of the original document to light rays during the copying operation of the apparatus; a rigid lid; and means for mounting said lid on said frame for displacement between a substantially horizontal closed position in which said lid projects beyond said one side and covers at least the transparent plate and a substantially horizontal fully open position in which said lid projects beyond said other side, said means including at least one hinge which is so situated with respect to said marginal portion of said frame that said lid abuts against said marginal portion to be held thereby in said substantially horizontal fully open position in order for said lid to be able to support another portion of the original document thereon.

2. A combination as defined in claim 1, wherein said hinge includes a link having a length substantially corresponding to a maximum thickness of a respective three-dimensional original document, and two pivots which articulate said link to said lid and to said frame, respectively.

3. A combination as defined in claim 1, wherein said mounting means further includes means for detachably connecting said hinge to one of said lid and frame.

4. In an optical copying apparatus, a combination comprising means for supporting a respective original document to be copied on the aparatus in a copying position, including a frame having a support surface and a marginal portion and bounding an opening which opens onto the support surface, and a transparent plate extending across said opening inwardly offset from said spport surface and serving to expose at least a portion of the original document to light rays during the copying operation of the apparatus; a rigid lid; means for mounting said lid on said frame for displacement between a closed position in which said lid covers at least the transparent plate and a fully open position, including at least one hinge which is so situated with respect to said marginal portion of said frame that said lid abuts against said marginal portion to be held thereby in the fully open position for said lid to be able to support another portion of the original document thereon; and a copying carriage movably mounted on the apparatus, said mounting means mounting said lid on said copying carriage.

5. In an optical copying apparatus, a combination comprising means for supporting a respective original document to be copied on the apparatus in a copying position, including a frame having a support surface and a marginal portion and bounding an opening which opens onto the support surface, and a transparent plate extending across said opening inwardly offset from said support surface and serving to expose at least a portion of the original document to light rays during the copying operation of the apparatus; a rigid lid, means for mounting said lid on said frame for displacement between a closed position in which said lid covers at least the transparent plate and a fully open position, including at least one hinge which is so situated with respect to said marginal portion of said frame that said lid abuts against said marginal portion to be held thereby in the fully open position for said lid to be able to support another portion of the original document thereon, said hinge including a link having a length substantially corresponding to maximum thickness of a respective three-dimensional original document, and two pivots which articulate said link to said lid and to said frame, respectively; and an abutment which is so located at said link as to entrain the same for displacement with said lid after the latter has been displaced from said closed position toward said fully open position through an angle of approximately 90°.

6. In an optical copying apparatus, a combination comprising means for supporting a respective original document to be copied on the apparatus in a copying position, including a frame having a support surface and a marginal portion and bounding an opening which opens onto the support surface, and a transparent plate extending across said opening inwardly offset from said support surface and serving to expose at least a portion of the original document to light rays during the copying operation of the apparatus; a rigid lid; and means for mounting said lid on said frame for displacement between a closed position in which said lid covers at least the transparent plate and a fully open position, including at least one hinge which is so situated with respect to said marginal portion of said frame that said lid abuts against said marginal portion to be held thereby in the fully open position for said lid to be able to support another portion of the original document thereon, said hinge including a link having a length substantially corresponding to a maximum thickness of a respective three-dimensional original document, and two pivots which articulate said link to said lid and to said frame, respectively, and said marginal portion of said frame being raised relative to the remainder of said support surface by a distance substantially corresponding to said length of said link.

7. In an optical copying apparatus, a combination comprising means for supporting a respective original document to be copied on the apparatus in a copying position, including a frame having a support surface and a marginal portion and bounding an opening which opens onto the support surface, and a transparent plate extending across said opening inwardly offset from said support surface and serving to expose at least a portion of the original document to light rays during the copying operation of the apparatus; a rigid lid; and means for mounting said lid on said frame for displacement between a closed position in which said lid covers at least the transparent plate and a fully open position, including at least one hinge which is so situated with respect to said marginal portion of said frame that said lid abuts against said marginal portion to be held thereby in the fully open position for said lid to be able to support another portion of the original document thereon, said hinge having at least one bearing block and an axle mounted on and interconnecting said lid and said bearing block for relative pivoting, and said mounting means further having means for detachably connecting said hinge to one of said lid and frame, including at least one edge portion which bounds an orifice in said frame, and at least one elastically yieldable portion of said bearing block which engages said edge portion to connect said bearing block to said frame.

8. A combination as defined in claim 7, wherein said one elastically yieldable portion has a projecting hook portion which engages behind said edge portion.

9. A combination as defined in claim 8, wherein said detachably connecting means further includes another elastically yieldable portion of said bearing block which is similar to and coextensively spaced from said one elastically yieldable projection.

10. A combination as defined in claim 9, wherein said projecting hook portions of said elastically yieldable portions extend in opposite directions from the respective elastically yieldable projections.

11. A combination as defined in claim 10, wherein said projecting hook portions of said elastically yieldable portions extend outwardly of said bearing block.

12. A combination as defined in claim 7, wherein said bearing block is of a resiliently yieldable synthetic plastic material.

13. In an optical copying apparatus, a combination comprising means for supporting a respective original document to be copied on the apparatus in a copying position, including a frame having a support surface and a marginal portion and bounding an opening which opens onto the support surface, and a transparent plate extending across said opening inwardly offset from said support surface and serving to expose at least a portion of the original document to light rays during the copying operation of the apparatus; a rigid lid; and means for mounting said lid on said frame for displacement between a closed position in which said lid covers at least the transparent plate and a fully open position, including at least one hinge which is so situated with respect to said marginal portion of said frame that said lid abuts against said marginal portion to be held thereby in the fully open position for said lid to be able to support another portion of the original document thereon, said hinge having an axle mounted on one of said frame lid, and said mounting means further comprising means for detachably connecting said hinge to one of said lid and frame, including at least one bifurcated connecting member rigid with the other of said lid and frame and having two elastically yieldable prongs which embrace said axle to connect said lids to said frame.

14. A combination as defined in claim 13, wherein said prongs have respective chamfered surfaces which contact said axle during the introduction of said axle between said prongs to elastically deflect the latter.

* * * * *